(12) United States Patent
Tuppen et al.

(10) Patent No.: US 8,609,185 B2
(45) Date of Patent: Dec. 17, 2013

(54) METHOD OF REPAIRING AN ALUMINIDE COATING ON AN ARTICLE

(75) Inventors: Stephen J. Tuppen, Derby (GB); Daniel Clark, Derby (GB); Alan S. Wood, Derby (GB)

(73) Assignee: Rolls-Royce, PLC, London (GB)

(*) Notice: Subject to any disclaimer, the term of this patent is extended or adjusted under 35 U.S.C. 154(b) by 711 days.

(21) Appl. No.: 12/458,873

(22) Filed: Jul. 27, 2009

(65) Prior Publication Data

US 2010/0062151 A1 Mar. 11, 2010

(30) Foreign Application Priority Data

Sep. 8, 2008 (GB) .................................. 0816255.4

(51) Int. Cl.
*B05C 13/00* (2006.01)
*B05D 3/00* (2006.01)
*B05D 3/02* (2006.01)
*B05D 3/04* (2006.01)
*B29C 71/02* (2006.01)

(52) U.S. Cl.
USPC ........... 427/142; 427/140; 427/532; 427/375; 427/376.1; 427/377; 427/378

(58) Field of Classification Search
USPC .............. 427/140, 142, 532, 545, 546, 376.1, 427/372.2, 375, 377, 378, 543; 423/3, 13, 423/14, 17, 58; 219/200, 260, 383, 481
See application file for complete search history.

(56) References Cited

U.S. PATENT DOCUMENTS

| 4,229,232 A * | 10/1980 | Kirkpatrick ................... 148/512 |
| 5,156,697 A * | 10/1992 | Bourell et al. ................. 264/497 |
| 5,795,659 A * | 8/1998 | Meelu et al. ................... 428/610 |
| 6,010,746 A * | 1/2000 | Descoteaux et al. .......... 427/142 |
| 6,497,920 B1 * | 12/2002 | Weimer et al. ................ 427/235 |
| 2006/0222776 A1 * | 10/2006 | Madhava et al. .............. 427/446 |

FOREIGN PATENT DOCUMENTS

| DE | 10 2006 028 2 | 12/2007 |
| EP | 0 934 795 A2 | 8/1999 |
| EP | 1 123 987 A1 | 8/2001 |
| EP | 1 256 635 A1 | 11/2002 |
| EP | 1 433 870 A1 | 6/2004 |
| EP | 1 881 154 A1 | 1/2008 |
| GB | 1 508 473 | 4/1978 |

OTHER PUBLICATIONS

European Search Report completed Nov. 11, 2010 issued in European Patent Application No. 09 251 878.6.

* cited by examiner

*Primary Examiner* — Michael Wieczorek
(74) *Attorney, Agent, or Firm* — Oliff & Berridge, PLC

(57) ABSTRACT

A method of locally repairing an aluminide coating (50) on a gas turbine engine nozzle guide vane (26) or a turbine blade (30,30B) comprises removing a damaged portion of the aluminide coating (50) from a portion (53) of the surface of the article. Any oxidised layer (54) is removed from the portion (53) of the surface of the article. Stoichiometric amounts of nickel and aluminium are placed on the portion (53) of the surface of the article using at least one foil (57). The stoichiometric amounts of nickel and aluminium are heat treated to form an aluminide patch coating (50B) on the portion (53) of the surface of the article and to bond the aluminide patch coating (50B) to the portion (53) of the surface of the article and to the aluminide coating (50) surrounding the aluminide patch coating (50B). The advantage is that the aluminide coating (50) surrounding the aluminide patch coating (50B) is not over aluminised.

26 Claims, 4 Drawing Sheets

METHOD OF REPAIRING AN ALUMINIDE COATING ON AN ARTICLE

The present invention relates to a method of repairing an aluminide coating on an article and in particular to a method of locally repairing an aluminide coating on a gas turbine engine component.

Gas turbine engine components, e.g. turbine blades, combustor nozzle guide vanes and turbine vanes, are generally provided with nickel aluminide coatings to provide high temperature oxidation resistance for the gas turbine engine components. In particular the gas turbine engine components comprise a nickel base superalloy substrate, which is provided with a nickel aluminide intermetallic coating. The nickel aluminide intermetallic coating is produced by depositing aluminium onto the surface of the nickel base superalloy substrate and inter-diffusing the aluminium and the nickel at the surface of the nickel base superalloy substrate, this process is known as aluminising. The aluminising process aims to produce a nickel aluminide intermetallic, a beta nickel aluminide NiAl. The aluminising process may be pack aluminising, slurry aluminising, out of pack vapour aluminising or chemical vapour deposition.

However, after service in a gas turbine engine it is necessary to repair damaged gas turbine engine components, e.g. turbine blades, combustor nozzle guide vanes and turbine blades, to enable them to be re-used in the gas turbine engine.

One method of repairing gas turbine engine components comprises removing all of the nickel aluminide coating from the gas turbine engine component, removing oxidation from the surface of the gas turbine engine component, repairing the gas turbine engine component and depositing a nickel aluminide coating on the gas turbine engine component. However, this method of repair is costly and time consuming and removes and replaces the nickel aluminide coating at portions of the gas turbine engine component where it is not necessary to remove the nickel aluminide coating.

A further method of repairing gas turbine engine components comprises removing the nickel aluminide coating from a localised portion of the gas turbine engine component, removing oxidation from the localised portion of the surface of the gas turbine engine component, repairing the localised portion of the gas turbine engine component and depositing a nickel aluminide coating on the localised portion of the gas turbine engine component. The nickel aluminide is deposited locally by providing a tape of aluminium and a halogen salt flux and locally heating to aluminise the localised portion of the gas turbine engine component.

A problem with the aluminising of a localised portion of the surface of the gas turbine engine component is that some of the aluminium may diffuse into the adjacent undamaged nickel aluminide coating. This additional aluminising of the adjacent undamaged nickel aluminide coating results in an increase in the concentration of aluminium in the undamaged nickel aluminide coating and this increases the risk of forming brittle aluminium rich phase, $NiAl_3$. This over aluminising around the localised portion of the gas turbine engine component produces a "halo" or "ring" in the undamaged nickel aluminide coating which has a high aluminium concentration.

Accordingly the present invention seeks to provide a novel method of locally repairing an aluminide coating on an article which reduces, preferably overcomes, the above mentioned problem.

Accordingly the present invention provides a method of locally repairing an aluminide coating on an article comprising the steps of:— a) removing a damaged portion of an aluminide coating from a portion of the article,
b) removing any oxidised layer from the portion of the article,
c) placing stoichiometric amounts of at least nickel and aluminium on the portion of the article, and
d) heat treating the stoichiometric amounts of at least nickel and aluminium to form an aluminide patch coating on the portion of the article and to bond the aluminide patch coating to the portion of the article and to the aluminide coating adjacent to the aluminide patch coating.

Preferably the method comprises after step d) removing excess aluminide patch coating from the portion of the article.

Preferably the aluminide coating comprises nickel aluminide and step c) comprises placing stoichiometric amounts of nickel and aluminium only to produce a nickel aluminide patch coating.

Step c) may comprise placing stoichiometric amounts of nickel powder and aluminium powder on the portion of the article.

Step c) may comprise placing nickel aluminide powder on the portion of the article.

Step c) may comprise placing at least one foil onto the portion of the article, the foil comprising pre-sintered nickel aluminide powder or pre-sintered nickel and aluminium powders.

Preferably step c) comprises placing 40 to 60 at % nickel and 60 to 40 at % aluminium to produce the nickel aluminide patch. More preferably step c) comprises placing 45 to 55 at % nickel and 55 to 45 at % aluminium to produce the nickel aluminide patch. In particular step c) comprises placing 50 at % nickel and 50 at % aluminium to form the nickel aluminide patch.

Alternatively the aluminide coating comprises platinum aluminide and step c) comprises placing stoichiometric amounts of platinum, nickel and aluminium to produce a platinum aluminide patch coating.

Step c) may comprise placing stoichiometric amounts of platinum powder, nickel powder and aluminium powder on the portion of the article.

Step c) may comprise placing platinum aluminide powder on the portion of the article.

Step c) may comprise placing at least one foil onto the portion of the article, the foil comprising pre-sintered platinum aluminide powder or pre-sintered platinum, nickel and aluminium powders.

Preferably step c) comprises placing up to 30 at % nickel, 50 to 20 at % platinum and 40 to 60 at % aluminium and aluminium to form the platinum aluminide patch. More preferably step c) comprises placing up to 25 at % nickel, 25 to 50 at % platinum and 44 to 55 at % aluminium to form the platinum aluminide patch. In particular step c) comprises placing 25 at % nickel, 25 at % platinum and 50 at % aluminium to form the platinum aluminide patch.

Step c) may comprise blowing the at least one foil onto the portion of the article. Preferably step c) comprises placing a first foil onto the portion of the article and placing at least one further foil onto the first foil. Preferably step c) comprises placing a plurality of further foils onto the first foil and each further foil is placed on a foil.

Step c) may comprise providing a melting point depressant with the stoichiometric amounts of at least nickel and aluminium. Preferably the melting point depressant is boron or copper.

Preferably step d) comprises locally heat treating the stoichiometric amounts of at least nickel and aluminium to form an aluminide patch coating on the portion of the article and to bond the aluminide patch coating to the portion of the article and to the aluminide coating adjacent the aluminide patch coating.

Preferably locally heat treating comprises providing a heating device, the heating device comprising an enclosure which extends over the portion of the article, the enclosure comprising nozzles to direct hot gas jets onto the portion of the article.

Preferably the method comprises impinging a high energy beam on the aluminide coating and moving the high energy beam from the periphery of the aluminide patch coating to the periphery of the aluminide coating to uniformly heat the periphery of the aluminide patch coating and the periphery of the aluminide coating.

Preferably the high energy beam is moved from the periphery of the aluminide patch coating to the periphery of the aluminide coating in a zig-zag pattern or the high energy beam is moved from the periphery of the aluminide patch coating to the periphery of the aluminide coating to form a cross-hatch pattern.

Preferably the high energy beam is a laser beam.

Preferably the article comprises a gas turbine engine component. Preferably the gas turbine engine component comprises a turbine vane, a turbine blade, a combustor nozzle guide vane or a turbine blisk.

The present invention will be more fully described by way of example with reference to the accompanying drawings in which:—

Figure 1:
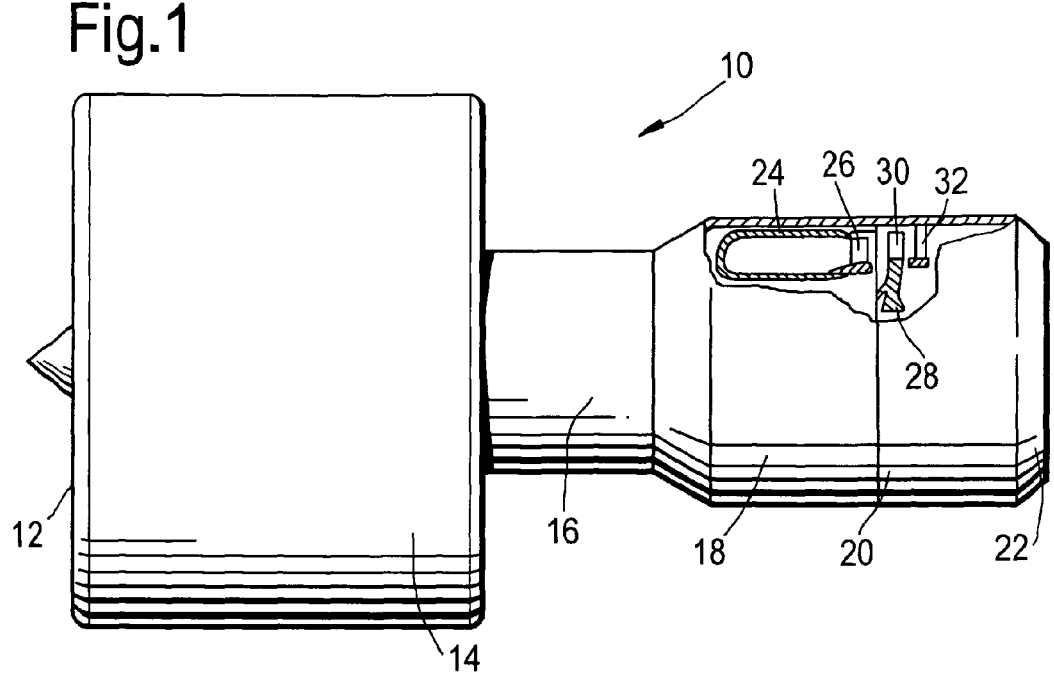
FIG. 1 shows a turbofan gas turbine according having an article with a nickel aluminide coating repaired according to the present invention.

A turbofan gas turbine engine 10, as shown in FIG. 1, comprises in flow series an intake 12, a fan section 14, a compressor section 16, a combustor section 18, a turbine section 20 and an exhaust 22. The fan section 14 comprises a fan. The compressor section 16 comprises an intermediate pressure compressor and a high pressure compressor arranged in flow series. The turbine section 20 comprises a high pressure turbine, an intermediate pressure turbine and a low pressure turbine arranged in flow series. The high pressure turbine is arranged to drive the high pressure compressor. The intermediate pressure turbine is arranged to drive the intermediate pressure compressor and the low pressure turbine is arranged to drive the fan in the fan section 14.

In operation air is compressed as it flows sequentially through the fan in the fan section 14 and the intermediate pressure compressor and the high pressure compressor in the compressor section 16. The compressed air is supplied to a combustor 24 in the combustor section 18, where fuel is burnt to produce hot gases. The hot gases flow sequentially through the high pressure turbine, the intermediate pressure turbine and the low pressure turbine in the turbine section 20.

Figure 2:
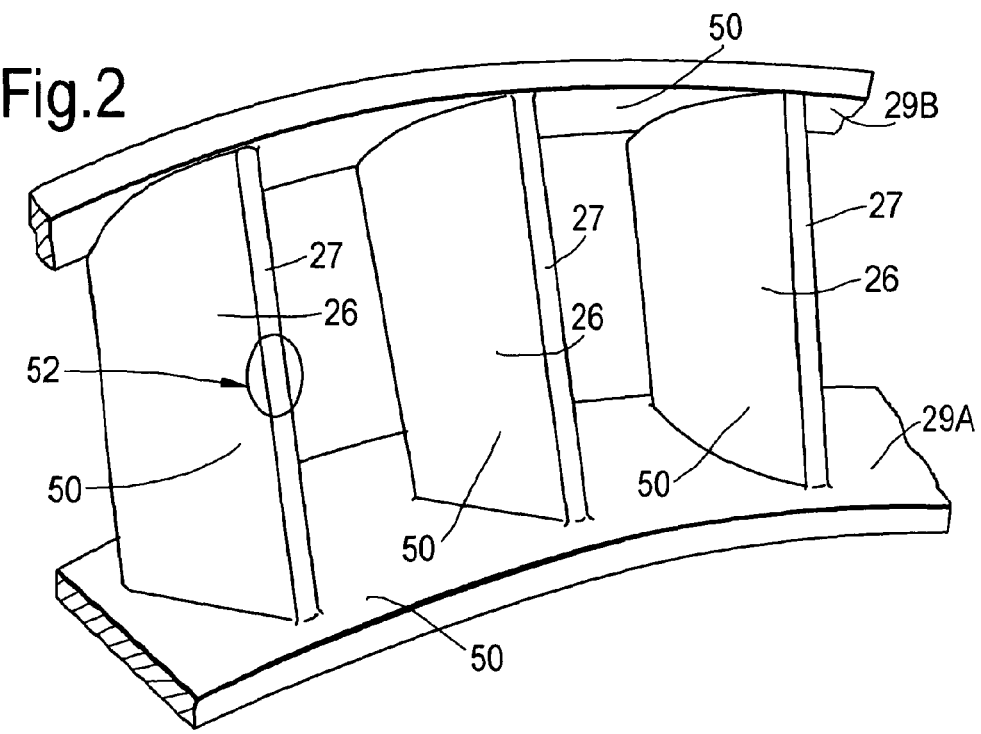
FIG. 2 is a perspective view of a combustor nozzle guide vane assembly with a nickel aluminide coating repaired according to the present invention.

The combustor 24 has a nozzle guide vane assembly 26, a portion of which is shown more clearly in FIG. 2. The high pressure turbine comprises a turbine disc 28 and a plurality of circumferentially spaced radially extending turbine blades 30, as shown more clearly in FIGS. 3 and 4. The high pressure turbine also comprises a plurality of turbine vanes 32 positioned downstream of the turbine blades 30.

FIG. 2 shows three of the nozzle guide vanes 26 and in particular the leading edges 27 of the nozzle guide vanes 26. The nozzle guide vanes 26 have radially inner platforms 29A and radially outer platforms 29B. The nozzle guide vanes 26 are provided with a nickel aluminide coating 50 on the gas washed surfaces of the nozzle guide vanes 26 and the gas washed surfaces of the radially inner and radially outer platforms 29A and 29B. A damaged portion 52 of the nickel aluminide coating 50 is shown at the leading edge 27 of one of the nozzle guide vanes 26.

Figure 3:
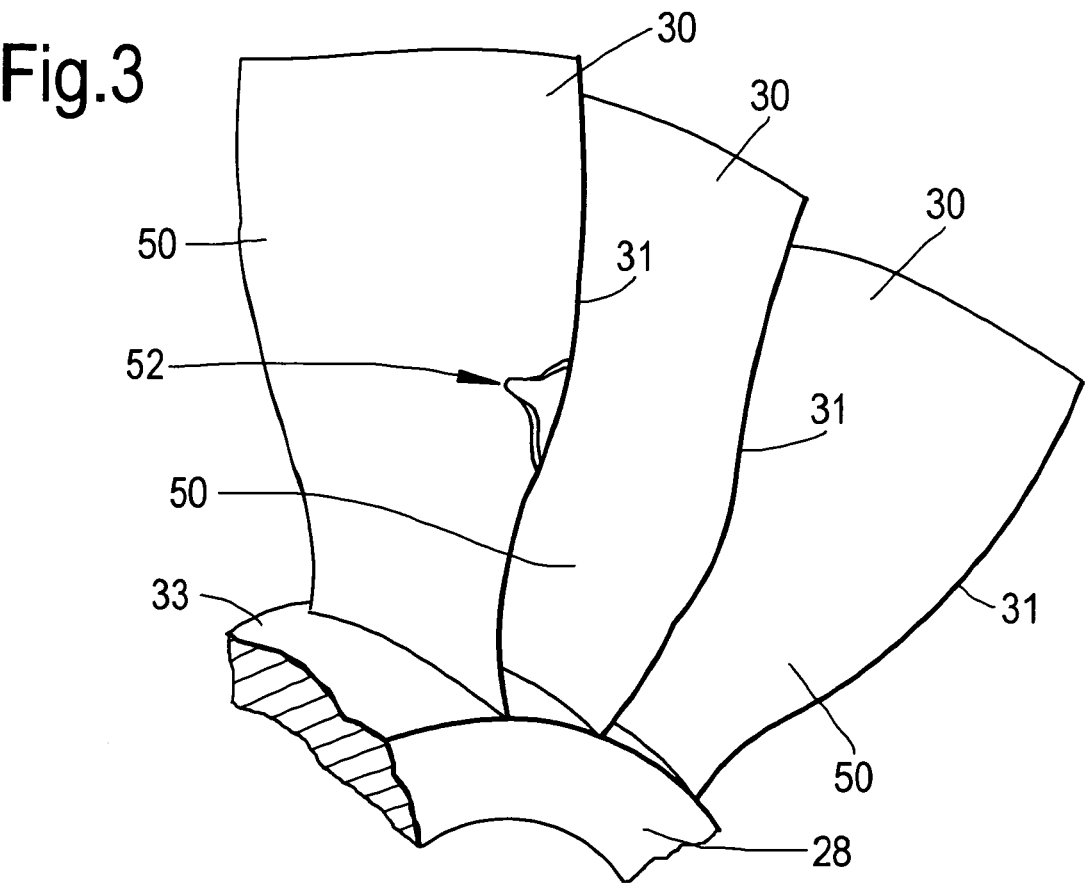
FIG. 3 is a perspective view of a turbine blisk with a nickel aluminide coating repaired according to the present invention.

FIG. 3 shows three turbine blades 30 and in particular the leading edges 31 of the turbine blades 30. In this arrangement the turbine blades 30 are integral with the turbine disc 28 to form a turbine blisk, turbine bling or turbine blum. The turbine disc 28 has a radially outer surface 33 located circumferentially between adjacent turbine blades 30. The turbine blades 30 are provided with a nickel aluminide coating 50 on the gas washed surfaces of the turbine blades 30 and the gas washed radially outer surface 33 of the turbine disc 28. A damaged portion 52 of the nickel aluminide coating 50 is shown at the leading edge 31 of one of the turbine blades 30.

Figure 4:
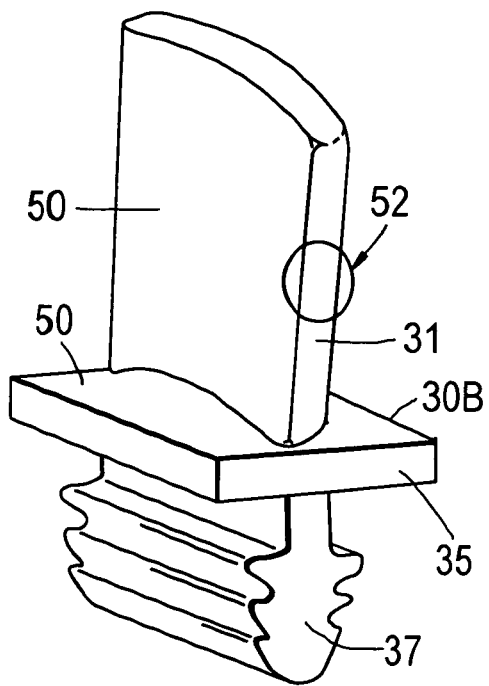
FIG. 4 is a perspective view of a turbine blade with a nickel aluminide coating repaired according to the present invention.

FIG. 4 shows one turbine blade 30B and in particular the leading edge 31 of the turbine blade 30B. In this arrangement the turbine blade 30B is separate to the turbine disc 28. The turbine blade 30B comprises a radially inner platform 35 and a firtree root 37. The firtree root 37 of each turbine blade 30B is arranged to locate in a corresponding one of a plurality of correspondingly shaped firtree slots in the periphery of the turbine disc 28, as is well known to those skilled in the art. The turbine blades 30B are provided with a nickel aluminide coating 50 on the gas washed surfaces of the turbine blades 30 and the gas washed surfaces of the radially inner platform 35. A damaged portion 52 of the nickel aluminide coating 50 is shown at the leading edge 31 of one of the turbine blades 30B.

Figure 5:
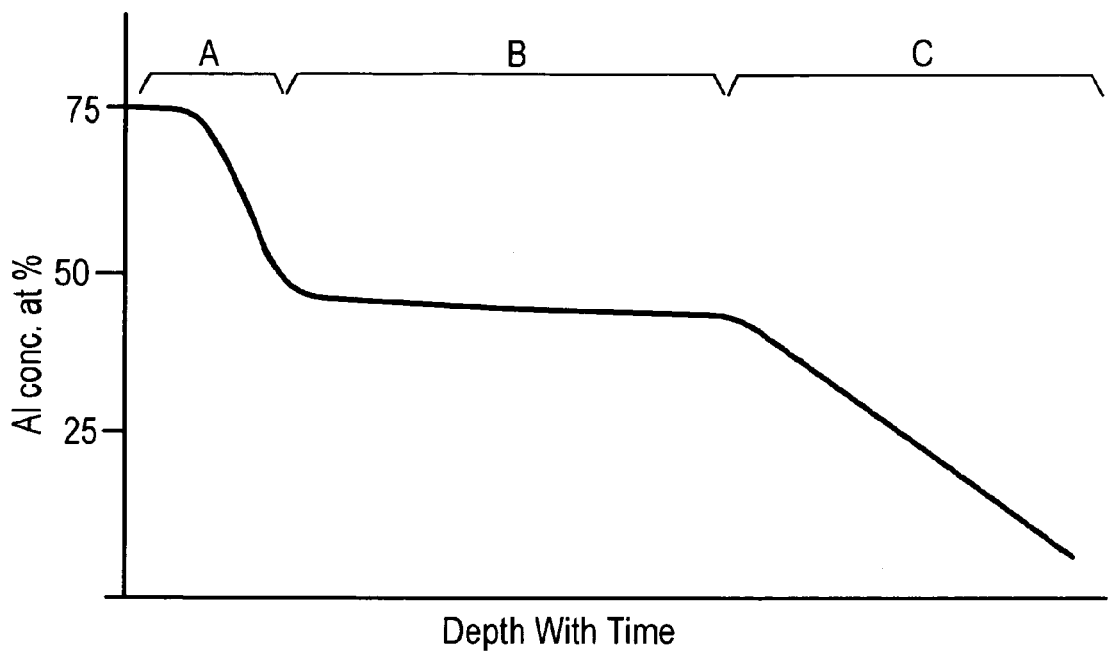
FIG. 5 is a graph of aluminium concentration in a nickel aluminide coating versus depth with time.

FIG. 5 shows a graph of aluminium concentration of a nickel aluminide coating on a gas turbine engine component versus depth with time. The graph shows that during service of a gas turbine engine component the concentration of aluminium changes. Initially in region A the concentration of aluminium may be up to 75 at % at the surface of the nickel aluminide coating, but this much aluminium makes the nickel aluminide coating brittle. The concentration of aluminium reduces at a relatively fast rate with time in region A to reach region B. In region A the aluminium diffuses from the nickel aluminide coating to the substrate of the gas turbine engine component. In region B chemically stable beta nickel aluminide coating forms, but aluminium again diffuses relatively slowly from the nickel aluminide coating to the substrate of the gas turbine engine component and the concentration of aluminium reduces relatively slowly. The concentration of aluminium reduces at a relatively fast rate with time in region C as aluminium diffuses from the nickel aluminide coating to the substrate of the gas turbine engine component. The aluminium in the nickel aluminide coating in region B acts as a reservoir of aluminium to provide the corrosion protection of the nickel aluminide coating. However, there must be a useful depth of the nickel aluminide coating. A problem arises when it is necessary to repair a nickel aluminide coating in that the thickness of the nickel aluminide coating is not known and the composition of the nickel aluminide coating is not known, the position of the nickel aluminide coating relative to FIG. 5 is not known, e.g. whether the nickel aluminide coating is in region B or region C or if the nickel aluminide coating is in region B the position in region B.

Figure 7:
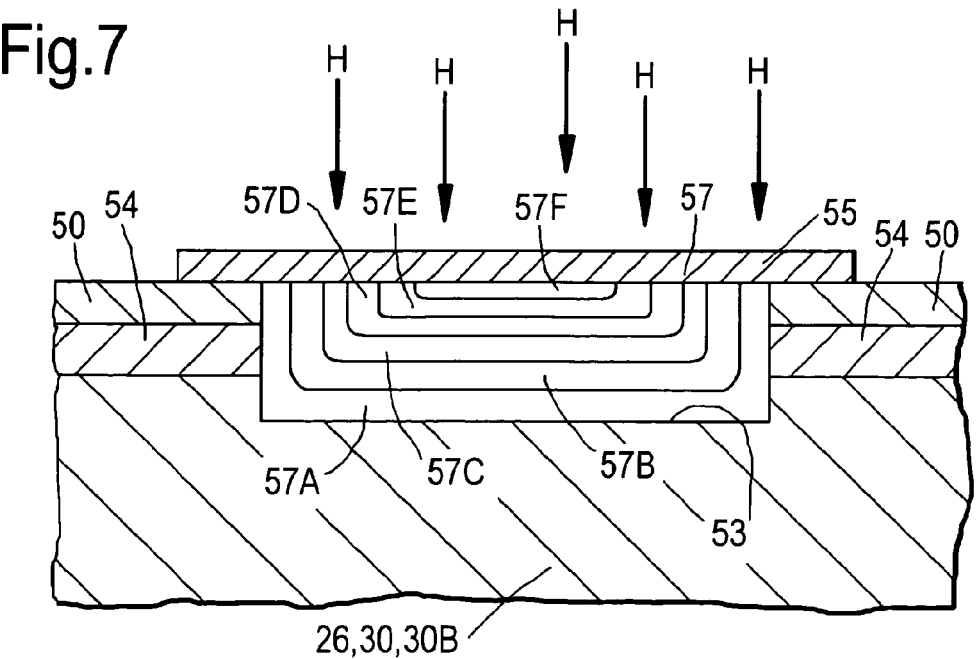
FIG. 7 is a cross-sectional view through a nickel aluminide coating after removal of a damaged portion of the nickel aluminide coating and a nickel aluminide foil for repairing the portion of the nickel aluminide coating.
Figure 6:
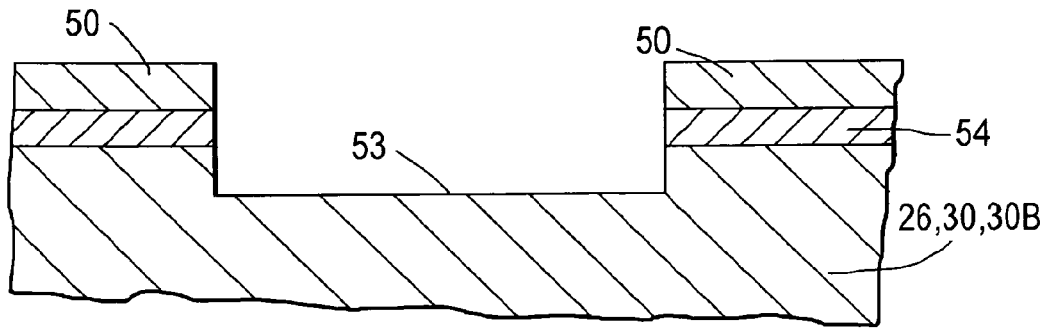
FIG. 6 is a cross-sectional view through a nickel aluminide coating after removal of a damaged portion of the nickel aluminide coating.
Figure 8:
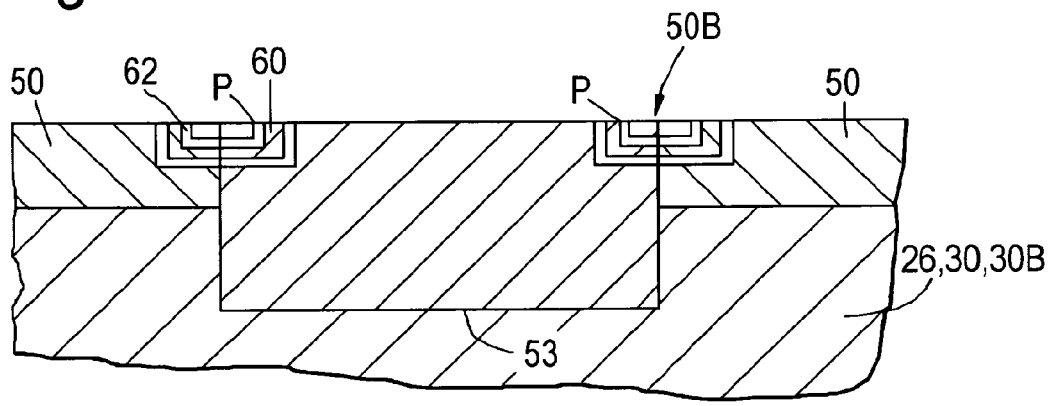
FIG. 8 is a cross-sectional view through a nickel aluminide coating and a repaired portion of the nickel aluminide coating showing stitching of an interface between the nickel aluminide coating and the repaired portion of the nickel aluminide coating.
Figure 9:
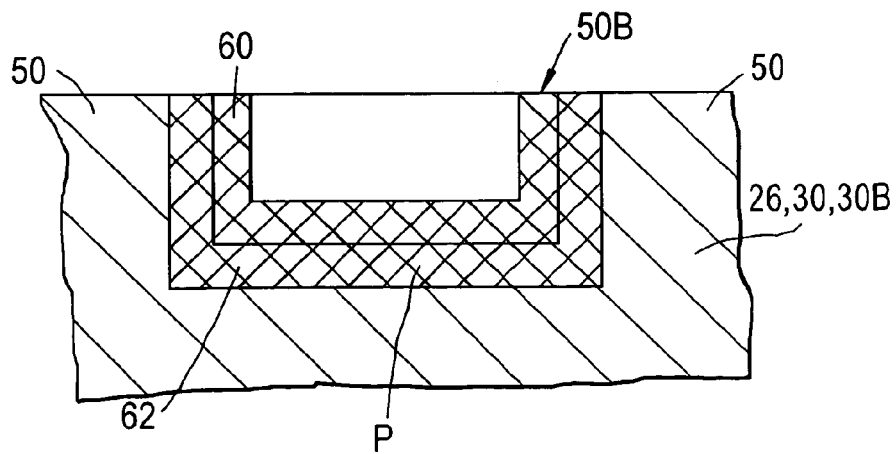
FIG. 9 is plan view of the nickel aluminide coating and the repaired portion of the nickel aluminide coating showing stitching of the interface between the nickel aluminide coating and the repaired portion of the nickel aluminide coating.

In order to locally repair the damaged portion 52 of the nickel aluminide coating 50 on the nozzle guide vane 26, or the turbine blade 30 or 30B, the following method, as illustrated in FIGS. 6 to 10, is used. Initially the damaged portion 52 of the nickel aluminide coating 50 is removed from a portion 53 of the surface of the nozzle guide vane 26, or the turbine blade 30 or 30B, as shown in FIG. 6. Any oxidised layer 54 is then removed from the portion 53 of the surface of the nozzle guide vane 26, or the turbine blade 30 or 30B, as shown in FIG. 6. It is to be noted that part of the substrate is removed from the portion 53 of the surface of the nozzle guide vane 26, or turbine blade 30 or 30B. Then stoichiometric amounts of nickel and aluminium 55 are placed on the portion 53 of the surface of the nozzle guide vane 26, or turbine blade 30 or 30B, as shown in FIG. 7. Then stoichiometric amounts of nickel and aluminium 55 are heat treated to form a nickel aluminide patch coating 50B on the portion 53 of the surface of the nozzle guide vane 26, or turbine blade 30 or 30B, and to bond the nickel aluminide patch coating 50B to the portion 53 of the surface of the nozzle guide vane 26, or turbine blade 30 or 30B, and to the nickel aluminide coating 50 adjacent to, or in some cases surrounding, the portion 53 of the surface of the nozzle guide vane 26, or turbine blade 30 or 30B, as shown in FIG. 8.

It may be necessary to remove any excess nickel aluminide patch coating 50B from the portion of the nozzle guide vane 26, or turbine blade 30 or 30B, if the repaired nickel aluminide patch coating 50B stands proud from the surface of the undamaged nickel aluminide coating 50 in order to regain an aerodynamic profile. The excess nickel aluminide patch coating 50B is removed by mechanical machining, e.g. grinding, or chemical machining, e.g. etching with an acid, electro-chemical machining using an electrolyte and the electrolyte may be an acid. The mechanical machining, chemical machining or electro-chemical machining may involve the use of agitation.

As shown in FIG. 6 the thickness of the nickel aluminide coating 50 may be up to 200 micrometers, the thickness of the oxide layer 54 may be up to 200 micrometers and the thickness of the nickel aluminide patch coating 50B may be up to 500 micrometers.

The stoichiometric amounts of nickel and aluminium may be placed on the portion 53 of the surface of the nozzle guide vane 26, or turbine blade 30 or 30B, by supplying and placing a mixture of nickel and aluminium powders, or particles. Alternatively the stoichiometric amounts of nickel and aluminium may be placed on the portion 53 of the surface of the nozzle guide vane 26, or turbine blade 30 or 30B, by supplying and placing nickel aluminide powder, or particles, on the portion 53 of the nozzle guide vane 26, or turbine blade 30 or 30B.

Alternatively, as shown in FIG. 7, the stoichiometric amounts of nickel and aluminium 55 are placed on the portion 53 of the surface of the nozzle guide vane 26, or turbine blade 30 or 30B, by placing at least one foil 57 on the portion 53 of the surface of the gas turbine engine component 26, 30 or 30B. The foil 57 comprises either pre-sintered nickel aluminide powder, or particles, or pre-sintered nickel and aluminium powder, or particles.

The foil 57 is placed on the portion 53 of the surface of the gas turbine engine component 26, 30 or 30B by blowing the at least one foil 57 onto the portion 53 of the surface of the gas turbine engine component 26, 30 or 30B. It may be necessary to place a first foil 57 onto the portion 53 of the surface of the gas turbine engine component 26, 30 or 30B and placing at least one further foil 57 onto the first foil 57. It may be necessary to place a plurality of further foils 57B to 57F onto the first foil 57A and each further foil 57B to 57F is placed on a preceding foil 57 in order to build up the required thickness of nickel aluminide patch coating 50B. The number of foils 57 required depends upon the thickness of the foils 57 and the required thickness of the nickel aluminide patch coating 50B. It may be necessary to heat the foils 57 to aid the blowing of the foils 57 onto the portion 53 of the surface of the nozzle guide vane 26, or turbine blade 30 or 30B, and in particular hot gas is arranged to impinge upon the foil 57 to heat it and to form it against the portion 53 of the surface of the nozzle guide vane 26, or turbine blade 30 or 30B. The edges of the foil 57 are held against the nickel aluminide coating 50. In particular FIG. 7 shows hot gas jets H impinging on the foil 57 to heat it and to blow it onto the portion 53 of the surface of the nozzle guide vane 26, or turbine blade 30 or 30B. The hot gas jets H are provided by a heating device which comprises an enclosure which extends over the portion 53 to be repaired. The enclosure is made from steel or ceramic and the enclosure comprises nozzles to direct hot gas jets H onto the foil 57. The hot gas jets may be argon or other inert gas. The heating device locally heats the portion 53 to be repaired.

The stoichiometric amounts of nickel and aluminium are heat treated using the heating device which provides hot gases jets H over the portion 53 to be repaired. The heating device locally heats the portion 53 to be repaired. The hot gas jets H sinter, consolidate and bond the nickel and aluminium to form the nickel aluminide patch coating 50B on the portion 53 to be repaired. The hot gas jets H provide impulses of heat into the surface of the nozzle guide vane 26 or turbine blade 30 or 30B. The hot gas jets H provide known quantities of gas, with known impulses of heat at a known rate into the surface of the nozzle guide vane 26 or turbine blade 30 or 30B to control the depth of heating into the surface of the nozzle guide vane 26 or turbine blade 30, 30B. This provides a shallow heating pattern, with temperature monitoring and sintering with validation parameters. The sintering may be at a temperature of about 1000° C. to 1200° C. for 1 to 6 hours and at a pressure of 4 to 5 bars, 0.4 to 0.5 MPa.

Following consolidation and sintering a laser beam, or other high energy beam, is directed to impinge upon the periphery 60 of the nickel aluminide patch coating 50B and to move to the periphery 62 of the nickel aluminide coating 50 adjacent to, or surrounding, the nickel aluminide patch coating 50B. The laser beam, or other high energy beam, is moved in a zig-zag pattern, or a cross-hatched pattern, P from the periphery 60 of the nickel aluminide patch coating 60 to the periphery 62 of the nickel aluminide coating 50 surrounding the nickel aluminide patch coating 50B and back throughout the full peripheries 60 and 62 of the nickel aluminide patch coating 50B and the nickel aluminide coating 50. Preferably there are up to five passes of the laser beam at each position on the peripheries 60 and 62. The laser beam, or other high energy beam, is moved in a pattern P such that the whole of the periphery of the nickel aluminide patch coating 50B and the whole of the periphery of the nickel aluminide coating 50 adjacent to, or surrounding, the nickel aluminide patch coating 50B are heated uniformly to the same degree, or by the same amount. Thus, the laser beam, or other high energy beam, produces repeatable process conditions to heat the whole of the periphery of the nickel aluminide patch coating 50B and the whole of the periphery of the nickel aluminide coating 50 adjacent to, or surrounding, the nickel aluminide patch coating 50B uniformly to the same degree, or by the same amount. The laser beam may be a pulsed laser beam which is pulsed at each point in its path or alternatively may be a continuous laser beam.

A melting point depressant may be provided with the stoichiometric amounts of nickel and aluminium in order to aid sintering of the nickel and aluminium powder, or particles or the nickel aluminide powder or particles. The melting point depressant may be boron or copper. The melting point depressant may be provided as a coating on the powder, or particles, preferably by sputtering.

The nickel aluminide powder, or particles, may be provided with a halogen salt flux coating, preferably by sputtering.

As mentioned here the stoichiometric amounts of nickel and aluminium means the amounts of nickel and aluminium required to produce beta nickel aluminide, NiAl. These stoichiometric amounts, or proportions, of nickel and aluminium provided are broadly 40 to 60 at % nickel and 60 to 40 at % aluminium, more preferably 45 to 55 at % nickel and 55 to 45 at % aluminium in particular 50 at % nickel and 50 at % aluminium, or 69 wt % nickel and 31 wt % aluminium, to produce NiAl. Thus amounts of nickel and aluminium powder, or particles, are provided accordingly or nickel aluminide is prepared with these proportions of nickel and aluminium.

A thin layer of nickel, and/or cobalt, up to 50 micrometers, may be provided to give inter-diffusion, on the portion of the surface of the gas turbine engine component prior to placing the stoichiometric amounts of nickel and aluminium to assist consolidation of the nickel aluminide patch coating. A thin layer, up to 50 micrometers, of aluminium may be provided on the portion of the surface of the gas turbine engine component prior to placing the stoichiometric amounts of nickel and aluminium to assist consolidation of the nickel aluminide patch coating.

The damaged portion 52 of the nickel aluminide coating 50 is removed by mechanical machining, e.g. by grinding, or chemical stripping, e.g. etching with an acid, electro-chemical machining using an electrolyte and the electrolyte may be an acid. The mechanical machining, chemical machining or electro-chemical machining may involve the use of agitation. The oxide layer 54 is removed by mechanical machining, e.g. grinding.

The nickel aluminide coating 50 may be provided with a mask before the damaged portion 52 is removed.

It may be possible to add small amounts of yttrium and/or lanthanum to the stoichiometric amounts of nickel and aluminium to increase oxidation resistance. It may be possible to add chromium and silicon to increase oxidation and/or corrosion resistance.

The advantage of the present invention is that because the required stoichiometric amounts of nickel and aluminium are provided as powder, or particles, or as nickel aluminide the time required for heat treatment, diffusion, is reduced. Additionally, because the required stoichiometric amounts of nickel and aluminium are provided as powder, or particles, or as nickel aluminide the concentration of aluminium in the original nickel aluminide coating 50 would not increase and change it to the brittle phase $NiAl_3$, the original undamaged nickel aluminide coating will not have a "halo" or "ring" with a high concentration of aluminium. Also, the stoichiometric amounts of nickel and aluminium provide optimum oxidation resistance. The use of nickel and aluminium powders may be metered to control the thickness and composition of the nickel aluminide coating. The use of nickel aluminide powder may be metered to control the thickness of the nickel aluminide coating. It may be possible to dispense with the requirement to solution heat treat the gas turbine engine component following repair of the nickel aluminide coating.

The present invention has been described with reference to a simple nickel aluminide coating which is repaired with stoichiometric amounts of nickel and aluminium. The present invention is also applicable to the repair of more complex aluminide coatings such as platinum aluminide coatings, chromium aluminide coatings or silicon aluminide coatings. In the case of a platinum aluminide coating the repair would involve the use of stoichiometric amounts of nickel, platinum and aluminium again in the form of nickel, platinum and aluminium powders, beta platinum aluminide powder, foil of pre-sintered nickel, platinum and aluminium powders or a foil of pre-sintered beta platinum aluminide powder.

These stoichiometric amounts, or proportions, of nickel, platinum and aluminium provided for a beta platinum aluminide are broadly more than 0 at % to 30 at % nickel, 50 to 20 at % platinum and 40 to 60 at % aluminium, more preferably more than 0 at % up to 25 at % nickel, 25 to 50 at % platinum and 44 to 55 at % aluminium. In particular the preferred composition is 25 at % nickel, 25 at % platinum and 50 at % aluminium, or 19 wt % nickel, 63.5 wt % platinum and 17.5 wt % aluminium. A further composition is 30 at % nickel, 30 at % platinum and 40 at % aluminium. Another composition is 20 at % nickel, 20 at % platinum and 60 at % aluminium. Thus amounts of nickel, platinum and aluminium powder, or particles, are provided accordingly or nickel/platinum aluminide is prepared with these proportions of nickel, platinum and aluminium.

Although the present invention has been described with reference to repairing aluminide coatings on gas turbine engine components, the present invention is also applicable to repairing aluminide coatings on other component or articles.

The invention claimed is:

1. A method of locally repairing an aluminide coating on an article comprising the steps of:
   a) removing a damaged portion of an aluminide coating from a portion of the article,
   b) removing any oxidised layer from the portion of the article,
   c) placing stoichiometric amounts of at least nickel and aluminium on the portion of the article, and
   d) heat treating the stoichiometric amounts of at least nickel and aluminium to form an aluminide patch coating on the portion of the article and to bond the aluminide patch coating to the portion of the article and to the aluminide coating adjacent to the aluminide patch coating, wherein
   step d) comprises locally heat treating the stoichiometric amounts of at least nickel and aluminium to form an aluminide patch coating on the portion of the article and to bond the aluminide patch coating to the portion of the article and to the aluminide coating adjacent to the aluminide patch coating and
   locally heat treating comprises providing an enclosure which extends over the portion of the article, the enclosure comprising nozzles directing hot gas jets onto the portion of the article to form the aluminide patch coating and to bond the aluminide patch coating to the portion of the article and to the aluminide coating adjacent to the aluminide patch coating.

2. A method as claimed in claim 1 comprising after step d) removing excess aluminide patch coating from the portion of the article.

3. A method as claimed in claim 1 wherein the aluminide coating comprises nickel aluminide and step c) comprises placing stoichiometric amounts of nickel and aluminium only to produce a nickel aluminide patch coating.

4. A method as claimed in claim 3 wherein step c) comprises placing stoichiometric amounts of nickel powder and aluminium powder on the portion of the article.

5. A method as claimed in claim 3 wherein step c) comprises placing nickel aluminide powder on the portion of the article.

6. A method as claimed in claim 3 wherein step c) comprises placing at least one foil onto the portion of the article, the foil comprising pre-sintered powder, the pre-sintered powder is selected from the group consisting of pre-sintered nickel aluminide powder and pre-sintered nickel and aluminium powder.

7. A method as claimed in claim 6 wherein step c) comprises heating and blowing the at least one foil onto the portion of the article.

8. A method as claimed in claim 7 wherein step c) comprises placing a first foil onto the portion of the article and placing at least one further foil onto the first foil.

9. A method as claimed in claim 3 wherein step c) comprises placing 40 to 60at% nickel and 60 to 40at% aluminium to produce the nickel aluminide patch coating.

10. A method as claimed in claim 3 wherein step c) comprises placing 45 to 55at% nickel and 55 to 45at% aluminium to produce the nickel aluminide patch coating.

11. A method as claimed in claim 3 wherein step c) comprises placing 50at% nickel and 50at% aluminium to form the nickel aluminide patch coating.

12. A method as claimed in claim 1 wherein the aluminide coating comprises platinum aluminide and step c) comprises placing stoichiometric amounts of platinum, nickel and aluminium to produce a platinum aluminide patch coating.

13. A method as claimed in claim 12 wherein step c) comprises placing stoichiometric amounts of platinum powder, nickel powder and aluminium powder on the portion of the article.

14. A method as claimed in claim 12 wherein step c) comprises placing platinum aluminide powder on the portion of the article.

15. A method as claimed in claim 12 wherein step c) comprises placing at least one foil onto the portion of the article, the foil comprising pre-sintered powder, the pre-sintered powder is selected from the group consisting of pre-sintered platinum aluminide powder and pre-sintered platinum, nickel and aluminium powders.

16. A method as claimed in claim 15 wherein step c) comprising heating and blowing the at least one foil onto the portion of the article.

17. A method as claimed in claim 16 wherein step c) comprises placing a first foil onto the portion of the article and placing at least one further foil onto the first foil.

18. A method as claimed in claim 12 wherein step c) comprises placing up to 30at% nickel, 50 to 20at% platinum and 40 to 60at% aluminium to form the platinum aluminide patch coating.

19. A method as claimed in claim 12 wherein step c) comprises placing up to 25at% nickel, 25 to 50 at% platinum and 44 to 55at% aluminium to form the platinum aluminide patch coating.

20. A method as claimed in claim 12 wherein step c) comprises placing 25at% nickel, 25at% platinum and 50at% aluminium to form the platinum aluminide patch coating.

21. A method as claimed in claim 1 wherein step c) comprises providing a melting point depressant with the stoichiometric amounts of at least nickel and aluminium wherein the melting point depressant is selected from the group comprising boron and copper.

22. A method as claimed in of claim 1 wherein the article comprises a gas turbine engine component.

23. A method as claimed in claim 22 wherein the gas turbine engine component is selected from the group consisting of a turbine vane, a turbine blade, a combustor nozzle guide vane and a turbine blink.

24. A method as claimed in claim 1 wherein in step d) the hot gas jets provide known quantities of gas, with known impulses of heat at a known rate into the surface of the article to control the depth of heating into the article.

25. A method of locally repairing an aluminide coating on an article comprising the steps of:
    a) removing a damaged portion of an aluminide coating from a portion of the article,
    b) removing any oxidised layer from the portion of the article,
    c) placing stoichiometric amounts of at least nickel and aluminium on the portion of the article, and
    d) locally heat treating the stoichiometric amounts of at least nickel and aluminium to sinter, consolidate and bond the nickel and aluminium to form an aluminide patch coating on the portion of the article and to bond the aluminide patch coating to the portion of the article and to the aluminide coating adjacent to the aluminide patch coating, wherein
       the locally heat treating comprises providing an enclosure which extends around the portion of the article, the enclosure comprising nozzles, directing hot gas jets onto the portion of the article to sinter, consolidate and bond the nickel and aluminum to form the aluminide patch coating and to bond the aluminide patch coating to the portion of the article and to the aluminide coating adjacent to the aluminide patch coating.

26. A method as claimed in claim 25 wherein step d) comprises sintering at a temperature of about 1000° C. to 1200° C.

* * * * *